Jan. 3, 1967    A. COCHARDT    3,296,471

DYNAMOELECTRIC MACHINE

Filed Dec. 11, 1963    2 Sheets-Sheet 1

Jan. 3, 1967   A. COCHARDT   3,296,471
DYNAMOELECTRIC MACHINE
Filed Dec. 11, 1963   2 Sheets-Sheet 2

United States Patent Office 3,296,471
Patented Jan. 3, 1967

3,296,471
DYNAMOELECTRIC MACHINE
Alexander Cochardt, R.D. 3, Box 233,
Export, Pa. 15632
Filed Dec. 11, 1963, Ser. No. 329,703
12 Claims. (Cl. 310—154)

The invention relates to dynamoelectric machine with permanent field excitation and, more particularly, to D.C. motors.

The invention is based upon my German application C28657 VIIIb/21d1,17 which was filed on December 13, 1962.

D.C. motors with two permanent magnets in the stator, have been constructed in the past in which the two permanent magnets are sandwiched between two iron segments in the stator. The iron segments constitute both the mutual pole shoes and the stator frame. The flux of both permanent magnets is combined and is caused to pass through the iron segments into the rotor. Due to the parallel arrangement of the two permanent magnets the permanent magnet flux reaching the rotor is essentially doubled and the power rating of the machine is increased by a factor of nearly two.

A major disadvantage of these prior-art systems is due to the occurrence of a considerable leakage flux which by-passes the usable flux linking the armature winding; hence the efficiency of such prior-art D.C. machines is low. Also, more recently developed high-energy permanent magnets on ferrite basis, such as those described in my U.S. Patent No. 3,113,927 do not lend themselves for effective incorporation in the prior-art systems in that the stator would have to be made excessively long in one direction. Furthermore, the provision of interpoles needed in certain larger-size D.-C. machines involves considerable design difficulties.

The chief object of the present invention is to provide a dynamoelectric machine, notably a two-pole D.C. motor, with permanent magnet excitation wherein the magnetic leakage flux is greatly reduced, said system being of simple design.

Another object of the invention is a ferrite permanent magnet D.C. motor with gap flux densities considerably larger than the gap flux densities of the ferrite prior-art motors.

A further object of the invention is a D.C. motor which facilitates inexpensive assembly thereof and, if required, the provision of interpoles and compensating windings.

Other objects of the invention will become apparent from the following description. The invention resides in a dynamoelectric machine comprising a stator member and a rotor member concentrically arranged within the stator member so as to define a magnetic gap between said stator and rotor members, said stator member including a magnetically conducting stator frame and a plurality of plate-like permanent magnets having a pair of opposite major surfaces that are planes and represent the pole faces, said permanent magnets being disposed within said stator frame having their one plane pole faces in direct contact with said stator frame and having their other plane pole faces in direct contact with at least one magnetically conducting pole shoe bordering said magnetic gap, at least two adjacent ones of said permanent magnets being in direct contact with a single common pole shoe whereby the magnetic fluxes of the said at least two adjacent permanent magnets are combined in said common pole shoe and the combined flux is caused to pass from said common pole shoe through said magnetic gap into said rotor, the arrangement being such that the interfaces between said common pole shoe and the permanent magnets in direct contact therewith define angle less than 180°.

The invention is particularly applicable to two-pole or multi-pole permanent magnet D.C. machines. It was found that in the arrangement of the subject invention there is essentially no magnetomotive force between the opposite sides of the stator frame. Consequently, there is essentially no leakage flux emanating from the stator frame, and the efficiency of the system is very high. The mutual pole shoes serve four functions. They greatly concentrate the permanent magnet flux onto the useful magnetic gap between stator and rotor. Gap flux densities as high as 7000 gauss have been accomplished with inexpensive, low-remanence-type ferrite magnets. They protect the permanent magnets from being demagnetized by momentary, excessive armature currents. They allow the use of magnets with simple, rectangular shapes which can be made to exhibit high energy at low cost. They provide an economical solution to the problem of obtaining a small air gap and a high gap permeance with extremely brittle permanent magnets.

The invention will become more readily apparent from the following detailed and exemplary description in connection with the accompanying drawings, wherein.

Figure 1:
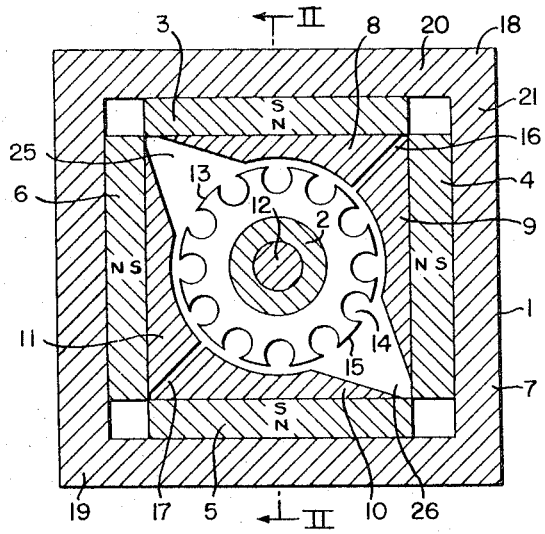
FIG. 1 shows a cross-section of a two-pole D.C. motor structure perpendicular to the axis.

The D.C. motor of FIG. 1 comprises a stator 1 and a rotor 2. The stator 1 comprises four permanent magnets 3, 4, 5, and 6, a stator frame 7, and pole shoe pieces 8, 9, 10, and 11. The permanent magnets are arranged in the stator with the two plane pole faces of each permanent magnet in direct contact with the stator frame 7 and the pole shoe pieces, respectively. As shown, the stator frame 7 is square-shaped, although other shapes having a closed or substantially closed cross-sectional configuration may be used. The rotor 2 contains a shaft 12 and, mounted on said shaft, stack of laminations 13 with armature slots 14 and teeth 15. The armature winding is not shown in FIG. 1. The two pole shoe pieces 8 and 9 constitute one common pole shoe and the two pole shoe pieces 10 and 11 constitute the second common pole shoe of the two-pole embodiment. Obviously, only one piece could be used for each pole shoe instead of the two pieces shown in FIG. 1. In order to reduce the flux shifting in the pole shoes due to armature cross-fields and to facilitate the pressing of such pieces, pole shoe slots 16 and 17 may be provided.

The direction of magnetization of the four permanent magnets 3, 4, 5, and 6 is indicated by the symbols N and S. The two permanent magnets 3 and 4 are arranged parallel to each other as are two permanent magnets 5 and 6. Due to the parallel arrangement the permanent magnet flux passing into the rotor 2 is essentially doubled, and the power rating of the machine is increased by a factor of nearly two. There is essentially no magnetomotive force between opopsite sides of the stator frame 7. Thus the leakage factor of the arrangement of FIG. 1 is small, and the efficiency of the machine is very high. The stator frame 7 does not need to be closed as shown in FIG. 1. It could be open along the corners 18 and 19 because there is little or no flux passing through these corners bearing in mind that points 20 and 21 are at essentially the same magnetic potential.

Figure 2:
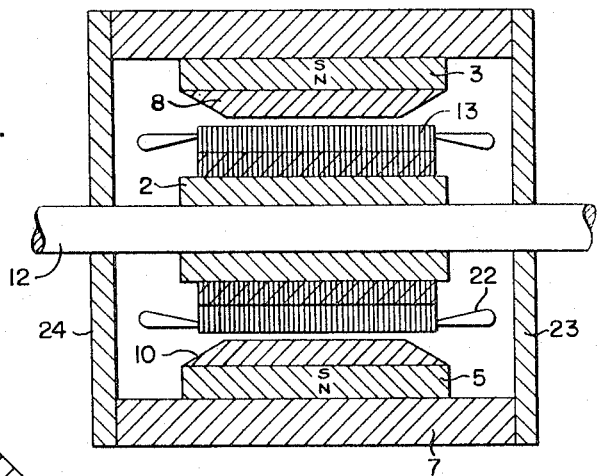
FIG. 2 shows the section 11—11 of FIG. 1.

The armature winding 22 is indicated in FIG. 2. The brushes, bearings, etc. (not shown in FIG. 2) can be attached to the end plates 23 and 24. As is evident from FIGS. 1 and 2, the pole shoe pieces 8, 9, 10, and 11 may taper down to the rotor surface in all four directions, thereby enhancing the concentration of the flux emanating from the permanent magnets 3, 4, 5, and 6 onto the rotor surface. In a typical dynamolelectric machine of the invention the flux density in the magnetic gap between stator 1 and rotor 2 is about 7000 gauss which is two to six times more gap flux density than in the prior-art ferrite D.C. motors.

The stator frame 7 is made from a magnetically conducting material, such as iron or low-carbon steel. It can have other forms than that shown in FIG. 1. For example, it can be rectangular or round. Similarly, there can be more than two magnets arranged parallel on each common pole shoe, for example, three or four. A parallel arrangement of more than two magnets on each common pole shoe is desirable in combination with a stator frame that is round on the outside and hexagon- or octagon-shaped on the inside. Still another embodiment of a two-pole electromagnetic system may include a stator frame consisting of a regular 8-cornered tube and eight permanent magnets arranged in two groups of four each, the four magnets of each group being respectively joined in a parallel manner to the two common pole shoes of the two-pole structure.

The permanent magnets preferably are anisotropic ferrite permanent magnets, such as, for example, the modified strontium ferrite magnets as described in my aforesaid U.S. Patent 3,113,927. These magnets should be plate-like having plane pole faces. Preferably, they should have shapes of rectangular parallelepipeds as shown in FIGS. 1 and 2, i.e., each magnet preferably has six flat rectangular surfaces with each two opposite surfaces being essentially equal in size. It was found that inexpensive high-energy permanent magnets should approach such rectangular parallelepiped shapes as shown in my copending application Serial No. 328,912 filed December 9, 1963. Examples of other permanent magnets suitable for the systems of the subject invention include Pt-Co-alloy magnets (Pt-23% Co) and other metallic permanent magnets such as those known under the trade name Alnico.

The pole shoe pieces 8, 9, 10, and 11 are made of a magnetically conducting material, preferably of a sintered, iron-containing material which is molded to shape after the sintering operation so that no machining is required. If the motor is to operate at high speeds, the electric resistivity of the pole shoes should be high. Exemplary pole shoe pieces having a high electrical resistivity are composed of an iron-powder-core material, of densely sintered silicon-iron, or of plastic-bound magnetic powder. The pole shoe pieces may, of course, also consist of laminated structures. Pole shoe pieces consisting of solid magnetic steel are feasible when the speed of the machine is not high. The end plates 23 and 24 can be made, for example, of a magnetically good conducting material. Part of the return flux is then carried through the end plates 23 and 24. The motor can then be made smaller because the wall thickness of the stator frame 7 can be reduced.

The motor of FIGS. 1 and 2 can be assembled as follows: A piece of square tubing is cut for the stator frame 7. The unmagnetized four permanent magnets 3, 4, 5, and 6 are ground on only their two plane pole faces. The four pole shoe pieces 8, 9, 10, and 11, when consisting of sintered material, may be molded to shape. The permanent magnets are then fastened to the stator frame, and the pole shoe pieces are fastened to the permanent magnets, for example, by means of a glue or by means of die-casting a lead-base alloy around the various components. If necessary, the stator, subsequent to assembly, may be machined to the precise inside diameter desired.

The most suitable method for magnetizing the permanent magnets depends on the size of the motor and the magnetic characteristic of the permanent magnets. The permanent magnets can be magnetized prior to the assembly of the stator components for small-size motors if permanent magnets with a high coercive force and constant recoil permeability are used. If permanent magnets with a knee in the demagnetization curve are used and if the motor is small, the permanent magnets are preferably magnetized after the assembly of the stator frame and before inserting the rotor into the stator. By this, a partial, permanent demagnetization of the permanent magnets is avoided. This has the added advantage that stator frame and pole shoe pieces can be made from a magnetically hard material because they would then be properly magnetized also.

For large machines permanent magnetizing coils are placed around each magnet, the rotor is placed into the stator structure, and only then the magnets are magnetized, preferably by a short current pulse from a condenser discharge magnetizer or a half-cycle magnetizer. This way, the large magnetic forces between stator and rotor become effective only after the final assembly of the motor. In addition, the use of permanent magnetizing coils allows the system to be switched to different levels of flux or to be switched off completely at any time. When in larger machines the rotor has to be removed from the stator, for example, for purposes of repair, the magnets are at least partially demagnetized through the magnetizing coils. To facilitate assembling or disassembling of the rotor and stator when the magnets are magnetized and when no magnetizing coils are provided, wedge-shaped iron-pieces can be slid into the openings 25 and 26 of FIG. 1 prior to assembly or disassembly, said wedge-shaped iron pieces magnetically short-circuiting both pole shoes and thus strongly reducing the magnetic forces between stator and rotor.

Figure 3:
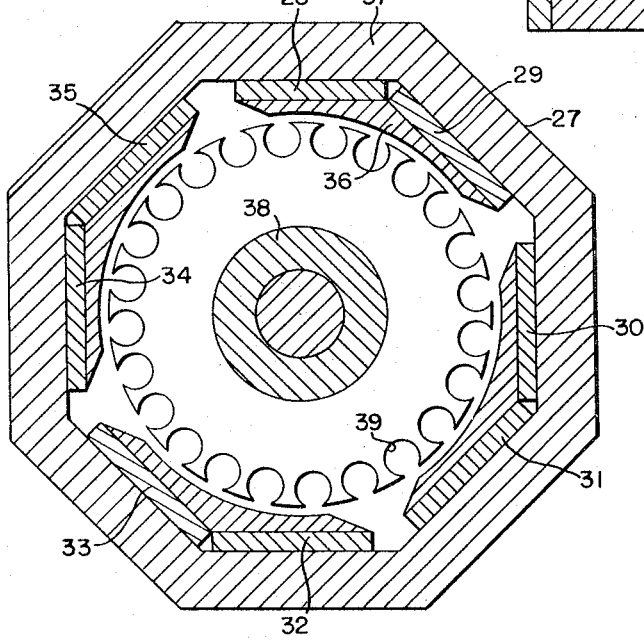
FIG. 3 shows a cross-section of a four-pole D.C. motor structure.

The invention is also applicable to four-pole or higher-pole machines. At least two permanent magnets are arranged parallel so that their flux is combined and is caused to pass through a mutual pole shoe common to said two or more magnets. The permanent magnets are in direct contact with the stator frame and the pole shoes, respectively. Each pole shoe may consist of two or more pole shoe pieces or of a single pole shoe piece as shown in the arrangement of FIG. 3. In the embodiment of FIG. 3, the stator 27 contains eight permanent magnets 28 to 35. The flux of each pair of parallel magnets is combined and is caused to pass through a common pole shoe. For example, the flux of the permanent magnets 28 and 29 passes through the common pole shoe 36. The pole faces of the eight permanent magnets are in direct contact with the stator frame 37 and the pole shoes, respectively. The stator frame 37 consists of a piece of 8-cornered steel tubing. The rotor contains more armature slots 39 than the rotor of FIG. 1 because of the higher pole member. The arrangement of FIG. 3 is usually preferred over that of FIG. 1 if the rotor diameter is larger than six inches.

Figure 4:
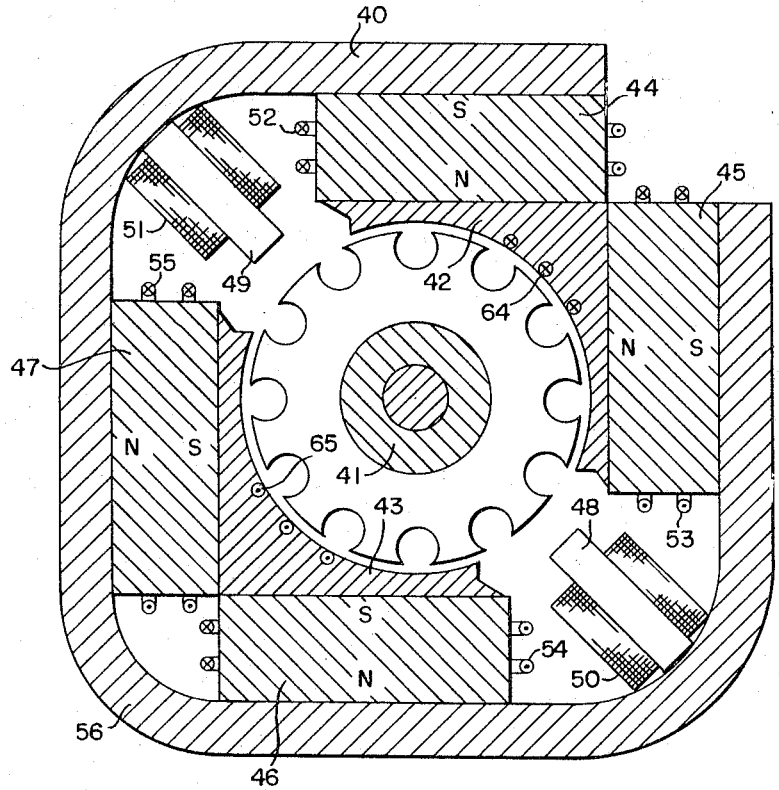
FIG. 4 shows a cross-section of a large two-pole D.C. machine with indicated interpoles, compensating windings, and magnetizing coils.

Interpoles and compensating windings, such as those needed for the operation of certain larger-size D.C. machines, can be used in the structure of the invention. The two-pole arrangement of FIG. 4 consists of a stator 40 and a rotor 41 and corresponds in principle to the structure of FIGS. 1 and 2. Interpoles with cores 48 and 49 and interpole coils 50 and 51 are placed between the mutual pole shoes 42 and 43. The flux of the pair of parallel permanent magnets 44 and 45 and the pair 46 and 47 is combined and is caused to pass through the mutual pole pieces 42 and 43, respectively. The interpole coils 50 and 51 are electrically connected to the armature windings, or they can be supplied with electric power from an external source. Magnetizing coils 52, 53, 54, and 55 are permanently attached to the four permanent magnets. The direction of the electric current through these coils and the compensating windings 64 and 65 is indicated in FIG. 4 through the symbols ⊗ and ⊙ in a conventional fashion. Flux originating from the interpoles passes through the corner 56 whereas there was no flux in the corners 18 and 19 of the structure of FIG. 1.

Figure 5:
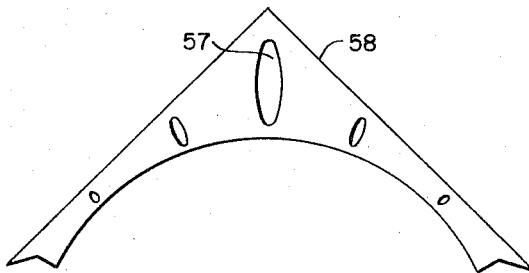
FIG. 5 shows a modified pole shoe for the systems of the invention.

In a further modification of the system of the invention, the pole shoes are provided with slots and/or holes, extending longitudinally in a direction parallel to the rotor axis. The slots are so arranged that the cross-sections thereof extend radially with respect to the rotor axis. There is less flux shifting in the pole shoes when such slots or holes are present. FIG. 5 shows an exemplary pole shoe provided with slots 57. The pole shoe 58 can, for example, be used in the structure of FIG. 4 and can be made by punching the desired slots or holes into steel sheets if the pole shoe 58 is made from a stack of laminations.

Figure 6:
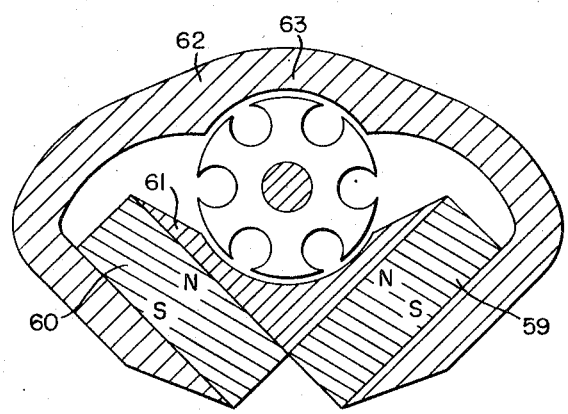
FIG. 6 shows a cross-section of a two-pole structure with only two permanent magnets.

A simple further modification of the structure of the invention is indicated in FIG. 6. Only two parallel permanent magnets 59 and 60 are provided. Their flux is combined and caused to pass through the common pole shoe 61. The stator frame 62 consists of a clamp-like yoke that can be made to have the required accurate inside diameter by a proper mechanical deformation such as bending. The stator frame 62 contains the second pole 63.

In some systems of the invention it is necessary that the permanent magnet flux passing into the rotor stays constant regardless of the operating temperature. For example, it may be required to keep the number of revolutions of a motor of the invention constant between −20 and 100° C. As is well known, the flux of all permanent magnets decreases with temperature. According to a further feature of the invention, compensating means can be provided for establishing a magnetic by-pass parallel to at least one permanent magnet, the magnetic by-pass consisting of a temperature-dependent magnetic material, such as a Fe-30% Ni-alloy. For example, wedge-shaped pieces of such an alloy may be fitted into the separations 25 and 26 of FIG. 1. In this way, the magnetic flux through the magnetic gap between stator and rotor may be kept essentially constant over the operating temperature range. Another method for the compensation of temperature effects consists in electrically connecting a negative-temperature-coefficient thermistor in series with the armature winding.

Apart from D.C. motors, the electromagnetic systems of the invention may be used in other electromagnetic devices, such as D.C. generators, eddy current brakes, eddy current couplings, and synchronous magnetic couplings. The part denoted here as "stator" may rotate, and the part denoted here as "rotor" may be stationary. In, for example, eddy current couplings and synchronous magnetic couplings made according to the principle of the invention both "stator" and "rotor" rotate.

I claim as my invention:

1. Dynamoelectric machine comprising a stator member and a rotor member concentrically arranged within the stator member so as to define a magnetic gap between said stator and rotor members, said stator member including a magnetically conducting stator frame and a plurality of plate-like permanent magnets having a pair of opposite major surfaces that are planes and represent the pole faces, said permanent magnets being disposed within said stator frame having their one plane pole faces in direct contact with said stator frame and having their other plane pole faces in direct contact with at least one magnetically conducting pole shoe bordering said magnetic gap, at least two adjacent ones of said permanent magnets being in direct contact with a single common pole shoe whereby the magnetic fluxes of the said at least two adjacent permanent magnets are combined in said common pole shoe and the combined flux is caused to pass from said common pole shoe through said magnetic gap into said rotor, the arrangement being such that the interfaces between said common pole shoe and the permanent magnets in direct contact therewith define angles less than 180°.

2. Dynamoelectric machine as claimed in claim 1, wherein said permanent magnets are magnetically anisotropic magnets having a rectangular parallelepiped configuration.

3. Permanent magnet D.C. machine comprising a stator member and a rotor member concentrically arranged within said stator member so as to define a magnetic gap between said stator and rotor members, said rotor member including armature winding means, said stator member containing at least two anisotropic ferrite permanent magnets having a rectangular parallelepiped configuration, the one pole face of each said permanent magnet being in direct contact with a magnetically conducting pole shoe bordering said magnetic gap and the other pole face of each said permanent magnet being in direct contact with a magnetically conducting stator frame, at least the inside surface of said stator frame being $n$-cornered where $n$ stands for the number of said permanent magnets, at least two adjacent ones of said permanent magnets forming an angle with each other that is different than 180° and being in contact with a common pole shoe whereby most of the flux of said parallel permanent magnets is combined and is caused to pass in a parallel manner through said common pole shoe and through said magnetic gap into said rotor member.

4. Dynamoelectric machine as claimed in claim 1, wherein each said pole shoe is made of a sintered iron-containing material which is molded to shape.

5. Dynamoelectric machine as claimed in claim 3, wherein each said pole shoe is made of a sintered iron-containing material which is molded to shape.

6. Dynamoelectric machine as claimed in claim 1, wherein each said pole shoe contains at least one slot extending substantially radially and being essentially parallel to the axis of said rotor member.

7. Dynamoelectric machine as claimed in claim 1, wherein compensating means are provided for establishing a magnetic by-pass parallel to at least one of said permanent magnets, said compensating means consisting of a temperature-dependent magnetic material for maintaining the magnetic flux through said magnetic gap essentially constant over the operating temperature range.

8. A permanent magnet D.C. machine as claimed in claim 3, wherein at least one of said permanent magnets is linked with a magnetizing coil provided for energization thereof whereby the flux level in said magnetic gap is variable by energizing said magnetizing coil with variable current pulses.

9. A permanent magnet D.C. machine as claimed in claim 3, wherein interpoles are provided between each two adjacent pole shoes, said interpoles being linked with winding means whereby the field excitation of said machine is in part electromagnetic.

10. A permanent magnet D.C. machine as claimed in claim 3, wherein said pole shoes contain compensating windings for superimposing an electromagnetic field onto the permanent-magnetic field.

11. Dynamoelectric machine comprising a stator member and a rotor member concentrically arranged within said stator member so as to define a magnetic gap between said stator and rotor members, said stator member containing at least two plate-like permanent magnets having a pair of opposite major surfaces that are planes and represent the pole faces, the one plane pole face of each said permanent magnet being in direct contact with a magnetically conducting pole shoe bordering said magnetic gap and the other pole plane face of each said permanent magnet being in direct contact with a magnetically conducting stator frame, at least two adjacent said permanent magnets being arranged as parallel permanent magnets forming an angle with each other that is less than 180° and being in contact with a common pole shoe whereby most of the flux of said parallel permanent magnets is combined and is caused to pass in a parallel manner through said common pole shoe and through said magnetic gap into the rotor member, at least one of said permanent magnets being linked with a magnetizing coil provided for energization thereof whereby the flux level in said magnetic gap is variable by energizing said magnetizing coil with a current pulse.

12. Dynamoelectric machine as claimed in claim 1, wherein each said pole shoe is made of a plastic-bound iron-containing material which is molded to shape.

References Cited by the Examiner

UNITED STATES PATENTS

| | | | |
|---|---|---|---|
| 1,605,294 | 11/1926 | Sethman | 310—181 |
| 1,622,145 | 3/1927 | Hunt | 310—181 |
| 2,048,161 | 7/1936 | Klaiber | 310—154 |
| 2,058,339 | 10/1936 | Metzger | 310—190 |
| 2,128,044 | 8/1938 | Grabner | 310—181 |
| 2,193,406 | 3/1940 | Goss et al. | 310—154 |
| 2,245,268 | 6/1941 | Goss et al. | 310—190 |
| 2,479,455 | 8/1949 | Aronoff | 310—154 |
| 2,482,875 | 9/1949 | Sawyer | 310—154 |
| 2,968,755 | 1/1961 | Baermann | 310—154 X |

MILTON O. HIRSHFIELD, *Primary Examiner.*

L. L. SMITH, *Assistant Examiner.*